(12) United States Patent
Ishiguro et al.

(10) Patent No.: US 8,073,133 B2
(45) Date of Patent: Dec. 6, 2011

(54) ECHO CANCELER AND ECHO CANCELING METHOD

(75) Inventors: Takashi Ishiguro, Saitama (JP); Koichi Kihara, Chiba (JP); Yuzuru Masuya, Kanagawa (JP); Junji Arai, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1078 days.

(21) Appl. No.: 11/976,257

(22) Filed: Oct. 23, 2007

(65) Prior Publication Data

US 2008/0175375 A1  Jul. 24, 2008

(30) Foreign Application Priority Data

Jan. 24, 2007  (JP) .................. 2007-014164

(51) Int. Cl.
*H04M 9/08* (2006.01)
*H04B 3/20* (2006.01)
(52) U.S. Cl. .................. 379/406.08; 370/290
(58) Field of Classification Search .......... None
See application file for complete search history.

(56) References Cited

U.S. PATENT DOCUMENTS

| | | | | |
|---|---|---|---|---|
| 6,195,430 | B1 * | 2/2001 | Eriksson et al. | 379/406.05 |
| 6,549,587 | B1 * | 4/2003 | Li | 375/326 |
| 6,744,886 | B1 * | 6/2004 | Benesty et al. | 379/406.08 |
| 6,968,064 | B1 * | 11/2005 | Ning | 381/66 |
| 7,672,445 | B1 * | 3/2010 | Zhang et al. | 379/406.01 |
| 2003/0112796 | A1 * | 6/2003 | Kwan | 370/352 |

FOREIGN PATENT DOCUMENTS

| | | |
|---|---|---|
| JP | 07-022984 A | 1/1995 |
| JP | 8-070268 | 3/1996 |
| JP | 2000-341178 | 12/2000 |
| JP | 2005-531200 | 10/2005 |
| WO | WO 02/39709 | * 5/2002 |

OTHER PUBLICATIONS

Hirano et al., "A Stochastic Gradient Algorithm with an Adaptive Step-Size Based on the Reference Signal Power and the Noise Power", IEICE, pp. 1-8, 1995.
Miyatake, N. M. et al., "A Time Varying Step Size normalized LMS Algorithm for Adaptive Echo Canceler Structures", IEICE Transactions on Fundamentals of Electronics, Communications and Computer Sciences, vol. E78-A, No. 2, Feb. 1995.
"Tekio Firuta Riron (Adaptive Filter Theory)", S. Haykin, translated by H. Suzuki et al., Kagaku gijyutsu shuppan, 2001, pp. 486-497.

* cited by examiner

*Primary Examiner* — Fan Tsang
*Assistant Examiner* — Jeffrey Lytle
(74) *Attorney, Agent, or Firm* — Rabin & Berdo, P.C.

(57) ABSTRACT

An echo canceler has an adaptive filter that generates an echo replica signal from a far-end signal. The filter coefficients of the adaptive filter are updated according to a residual error signal, which is obtained by subtracting the echo replica signal from a near-end signal to cancel echo. A background noise estimator estimates the near-end background noise power level from the residual error signal. A step size calculator uses the estimated near-end background noise power in determining the step size of the adaptive updating of the filter coefficients. When the estimated near-end background noise level is high, a small step size is used, which improves echo cancellation under these conditions. When the estimated near-end background noise level is low, a larger step size is used to permit rapid convergence of the filter coefficients.

8 Claims, 13 Drawing Sheets

ECHO CANCELER AND ECHO CANCELING METHOD

BACKGROUND OF THE INVENTION

1. Field of the Invention

The present invention relates to an echo canceler and echo canceling method useful, for example, for canceling line echo arising from a hybrid circuit in a telephone circuit.

2. Description of the Related Art

Figure 1:
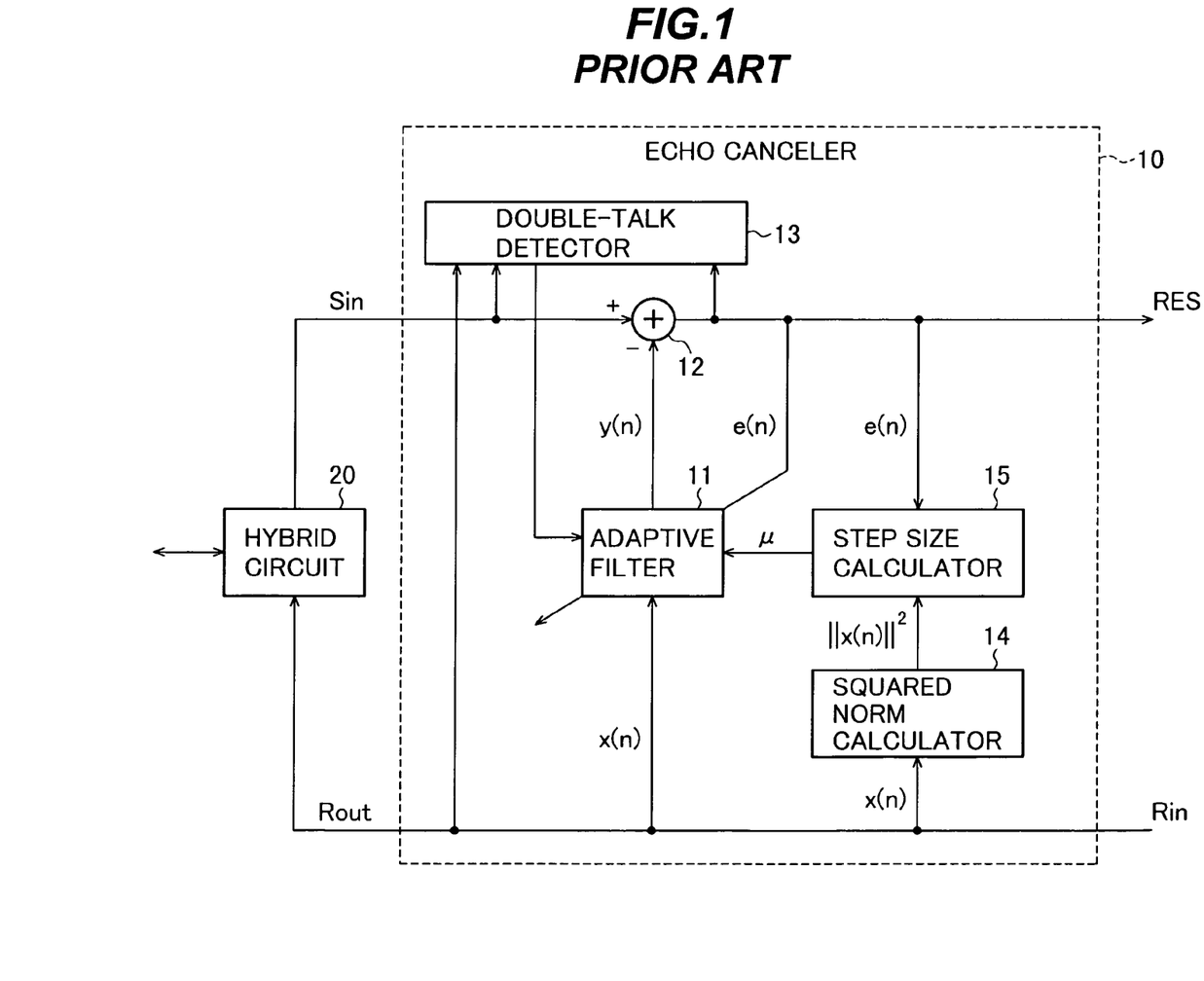
FIG. 1 is a functional block diagram of a conventional echo canceler.

Referring to FIG. 1, a conventional echo canceler 10 of this type comprises an adaptive filter 11, a subtractor 12 (depicted as an adder with a negative subtrahend input terminal), a double-talk detector 13, a squared norm calculator 14, and a step size calculator 15.

The echo canceler 10 receives a far-end input signal Rin from the party at the far end of the telephone connection. This far-end input signal Rin is furnished to the party at the near end of the connection as a far-end output signal Rout, and is furnished to the adaptive filter 11 as a digital far-end signal x(n).

The adaptive filter 11 uses a set of filter coefficients to filter the far-end signal x(n) (which is identical to Rin), thereby generates an echo replica signal y(n), and updates the filter coefficients according to a residual error signal e(n).

The subtractor 12 subtracts the echo replica signal y(n) from a near-end input signal Sin received from the party at the near end to generate the residual error signal RES (also denoted e(n)), which is input to the adaptive filter 11 and, at the same time, is transmitted toward the party at the far end. The subtractor 12 thereby removes an echo from the outgoing signal sent to the far end.

The double-talk detector 13 monitors the far-end input signal Rin, near-end input signal Sin, and residual error signal RES to supervise the state of speech on the line. The double-talk detector 13 disables the updating of the coefficients in the adaptive filter 11 when the party at the near end speaks, when both parties speak, and when neither party is speaking, and enables updating of the coefficients when only the party at the far end speaks.

The squared norm calculator 14 receives the far-end input signal Rin (x(n)), calculates its squared norm ($\|x(n)\|^2$), and outputs the calculated result to the step size calculator 15. The squared norm ($\|x(n)\|^2$) is calculated as follows:

$$\|x(n)\|^2 = x^2(n) + x^2(n-1) + \ldots + x^2(n-M+1)$$
$$= \|x(n-1)\|^2 + x^2(n) - x^2(n-M)$$

The letter M indicates the tap length of the adaptive filter 11.

The step size calculator 15 receives the squared norm ($\|x(n)\|^2$) of the far-end input signal Rin (x(n)) and the residual error signal RES (e(n)), calculates a step size for updating the filter coefficients, and provides the step size to the adaptive filter 11.

The hybrid circuit 20 in FIG. 1 has a two-wire/four-wire conversion function with which it interfaces the two-wire circuit leading to the near-end telephone (not shown) with the four-wire circuit formed by the separate transmitting and receiving paths in the echo canceler 10.

When the party at the far end speaks, the input signal Rin that the echo canceler 10 receives from the far end is passed to the hybrid circuit 20 as the far-end output signal Rout (Rout is identical to the far-end input signal Rin) and, at the same time, is provided internally to the adaptive filter 11.

The hybrid circuit 20 transmits the far-end output signal Rout onward to the party at the near end, or more precisely, to the near-end party's telephone (not shown). Some of the signal energy, however, leaks into the near-end input signal Sin and returns to the echo canceler 10 as line echo. If only the far-end party is speaking, substantially all of the near-end input signal Sin may be line echo.

In the echo canceler 10, the adaptive filter 11 uses the filter coefficients to filter the far-end input signal x(n), thereby generates the echo replica signal y(n), and outputs it to the subtractor 12. The subtractor 12 subtracts the echo replica signal y(n) from the near-end input signal Sin to remove the echo.

One known algorithm for updating the coefficients of the adaptive filter is the normalized least mean squares (LMS) algorithm.

The normalized LMS coefficient updating formula can be written, for example, as follows (k=0, 1, 2, ..., M−1):

$$h_k(n+1) = h_k(n) + \frac{\alpha e(n)}{\beta + \|x(n)\|^2} x(n-k)$$

In the above equation, $\alpha$ is a step size parameter, the terms $h_k(n)$ and $h_k(n+1)$ are the filter coefficients before updating and after updating, respectively, and M is the filter tap length. The quantity $\beta$ is a constant that is normally greater than zero, but may be set to zero.

The term $\|x(n)\|^2$ represents the squared norm of the far-end input signal Rin (x(n)) and can be calculated as shown above.

If a step size $\mu$ variable is defined as $$\mu = \frac{\alpha}{\beta + \|x(n)\|^2},$$

the variable $\mu$ can be used to rewrite the normalized LMS coefficient updating formula in the following form:

$$h_k(n+1) = h_k(n) + \mu \cdot e(n) \cdot x(n-k)$$

The adaptive filter 11 calculates the value of the echo replica signal y(n) as follows:

$$y(n) = \sum_{k=0}^{M-1} x(n-k) \cdot h_k(n)$$

From these equations, the step size calculator 15 calculates the step size $\mu$ and the adaptive filter 11 updates the filter coefficients $h_k(n)$ and generates the echo replica signal y(n).

The normalized LMS algorithm converges if $0<\alpha<2$. Convergence is fastest with unity step size ($\alpha=1.0$), but with smaller step size values, the updating of the filter coefficients becomes more conservative and the stability of the adaptive filter is improved. Improved stability means that the filter coefficients are less apt to diverge because of disturbances such as near-end background noise, or because of narrow-band signal inputs such as tone signals.

Details of the normalized LMS algorithm can be found in *Adaptive Filter Theory* by Simon Haykin (Prentice Hall, fourth edition 2001).

An ideal echo canceler should have high convergence speed, little residual error after adaptation has converged, and high stability.

A problem with the conventional echo canceler described above is that the echo cancellation performance is significantly degraded in environments with much near-end background noise.

Figure 2A:
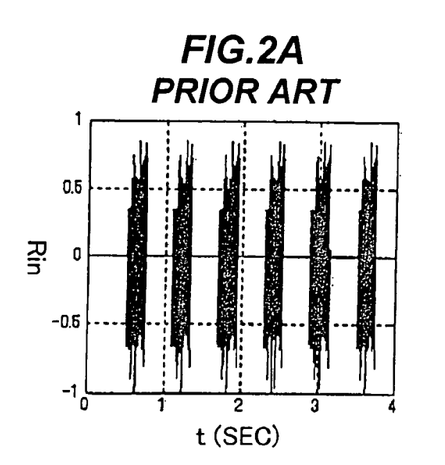
FIGS. 2A to 2E show simulated signal waveforms in the conventional echo canceler in an environment with little background noise.
Figure 2B:
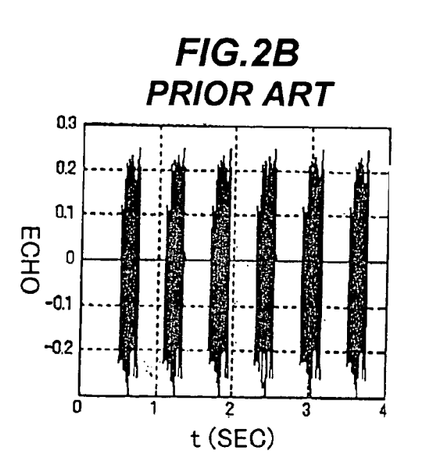
Figure 2C:
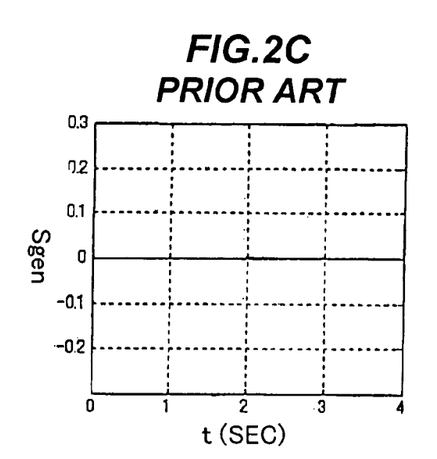
Figure 2D:
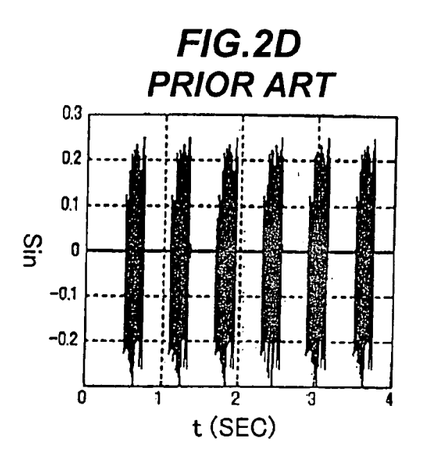
Figure 2E:
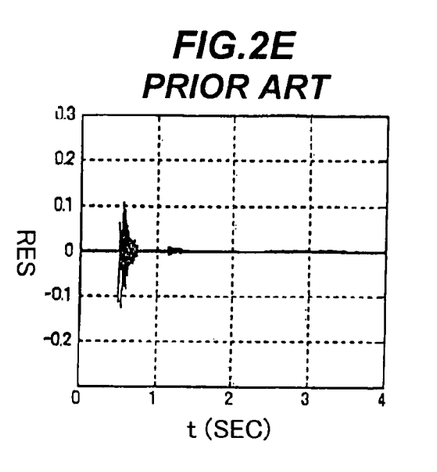

FIGS. 2A to 2E show simulated signal waveforms in the conventional echo canceler in an environment with little background noise: FIG. 2A represents the received far-end input signal Rin; FIG. 2B shows the corresponding echo that leaks through the hybrid circuit 20; FIG. 2C represents near-end background noise Sgen; FIG. 2D shows the near-end input signal Sin; FIG. 2F represents the residual signal RES after echo cancellation. Time (t) in seconds (sec) is indicated on the horizontal axis in these figures. The vertical scale in FIG. 2A is compressed in relation to the vertical scales in FIGS. 2B to 2E. FIGS. 3A to 3E show the corresponding simulated signal level waveforms, signal level being expressed in dBm.

Figure 3A:
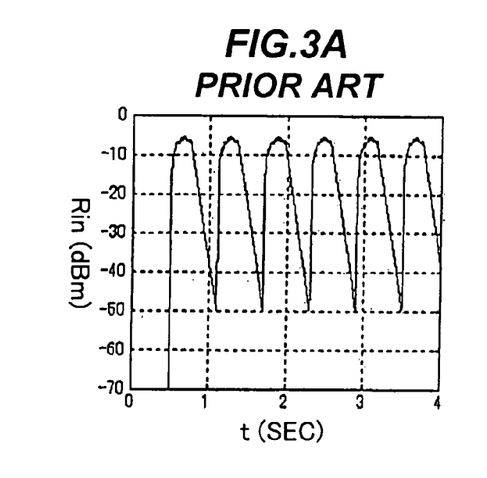
FIGS. 3A to 3E show simulated signal level waveforms in the conventional echo canceler in an environment with little background noise.
Figure 3B:
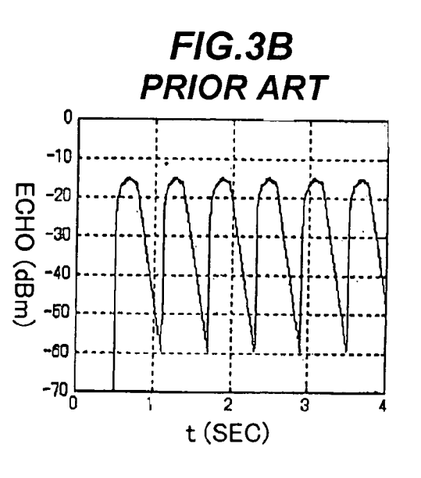
Figure 3C:
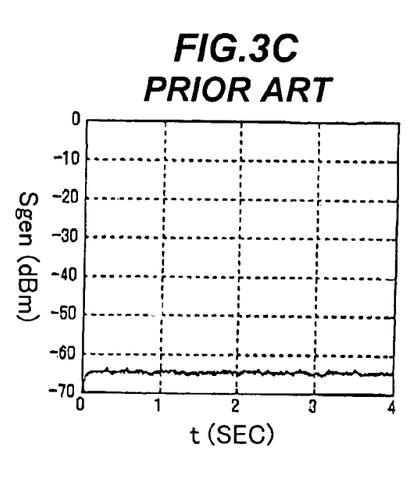
Figure 3D:
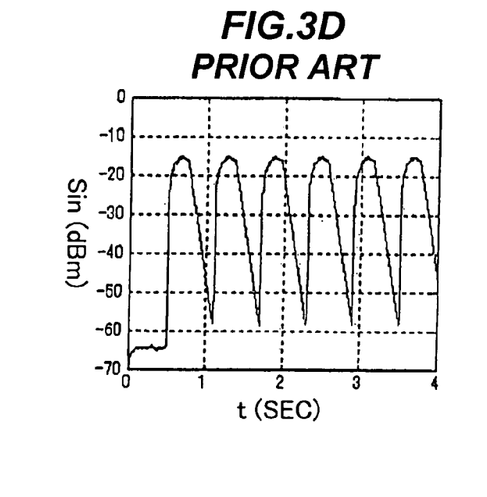

In these simulations, the characteristics of the echo path were modeled by use of echo path model 1 in Annex D of Recommendation G.168-2004 of the Telecommunication Standardization Sector of the International Telecommunications Union (ITU-T). The hybrid echo return loss was assumed to be 10 dB, so the signal level of the echo signal Echo in FIG. 3B is 10 dB lower than the signal level of the far-end input signal Rin in FIG. 3A.

Near-end background noise is indicated by the symbol Sgen. A background noise level of −65 dBm is assumed as an example of an environment with little background noise.

The near-end input signal Sin is the sum of the echo signal Echo and the near-end background noise Sgen.

The signal levels in FIGS. 3A to 3E were calculated according to the level measurement method described in the G.168-2004 Section 6.4.1.2.1.

In the simulations in FIGS. 2A to 2E and FIGS. 3A to 3E, the step size parameter α, constant β, and filter tap length M were set to the following values: α=0.5, β=0, M=128.

Although the double-talk detector 13 monitors the far-end input signal Rin, near-end input signal Sin, and residual error signal RES to supervise the speech state, since the near-end party was assumed not to be speaking in this simulation, the operation of the double-talk detector 13 was simplified as follows. If the condition $$\|x(n)\|^2 \leq -40 \text{ dbm}$$

is true, the far-end input signal Rin(x(n)) is treated as silent and the double-talk detector 13 disables updating of the coefficients in the adaptive filter 11; otherwise, the double-talk detector 13 enables updating of the coefficients in the adaptive filter 11. The threshold value (−40 dBm) is exemplary; other values could be used instead.

Figure 3E:
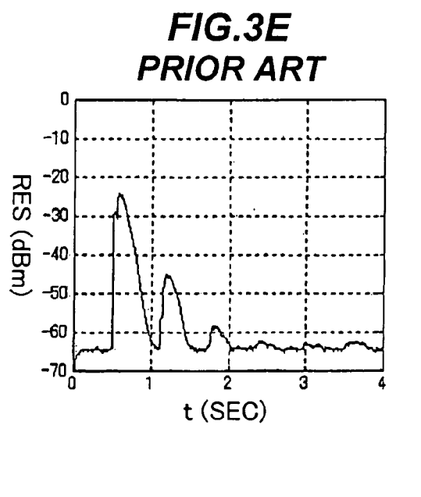
Figure 4A:
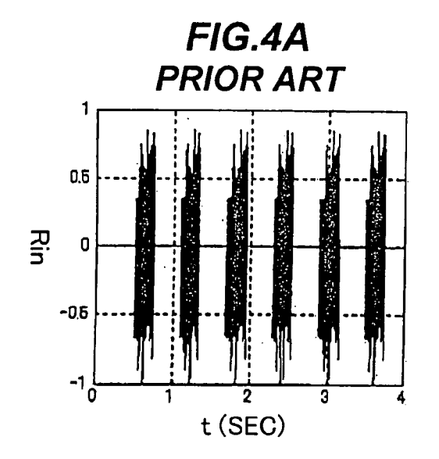
FIGS. 4A to 4E show simulated signal waveforms in the conventional echo canceler in an environment with much background noise.
Figure 4B:
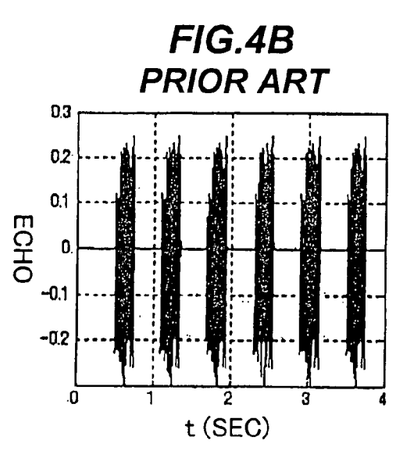
Figure 4C:
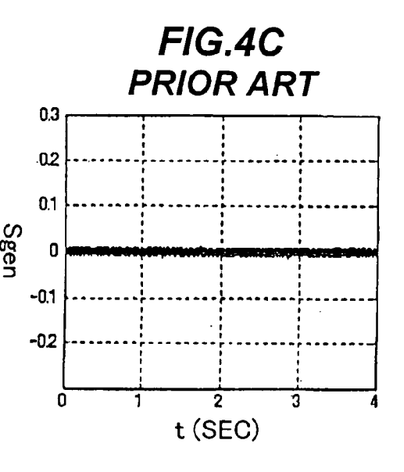
Figure 4D:
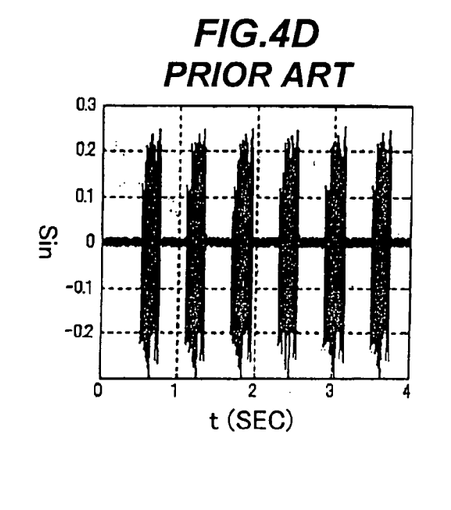
Figure 4E:
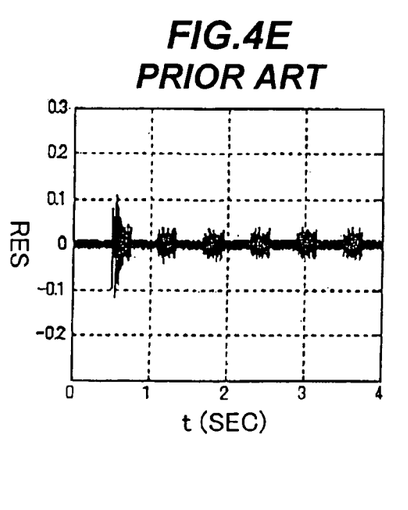

As shown by the signal levels in FIGS. 3B and 3E, although the echo signal level of the near-end input signal Sin reaches peak values of about −15 dBm, the level of the residual error signal RES after convergence is close to the background noise level of −65 dBm, indicating that the echo has been successfully canceled.

FIGS. 4A to 4E and FIGS. 5A to 5E show simulation results for the conventional echo canceler in an environment with much background noise. The signals represented and the scales on the horizontal and vertical axes are the same as in FIGS. 2A to 2E and FIGS. 3A to 3E.

As an example of an environment with much background noise, the level of the background noise Sgen generated at the near end was assumed to be −45 dBm. The other conditions were the same as in the preceding simulation of an environment with little background noise.

Figure 5A:
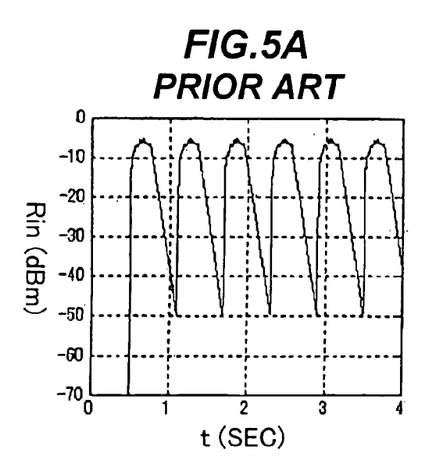
FIGS. 5A to 5E show simulated signal level waveforms in the conventional echo canceler in an environment with much background noise.
Figure 5B:
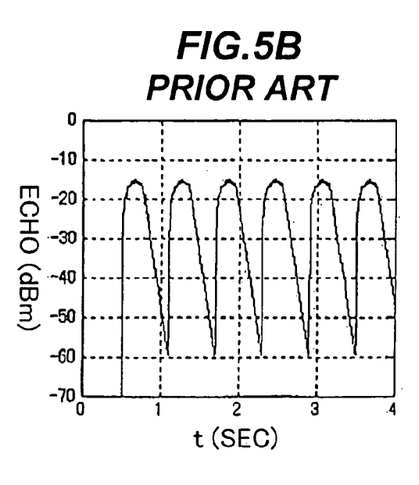
Figure 5C:
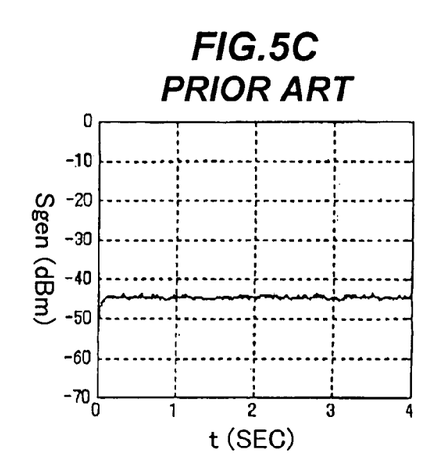
Figure 5D:
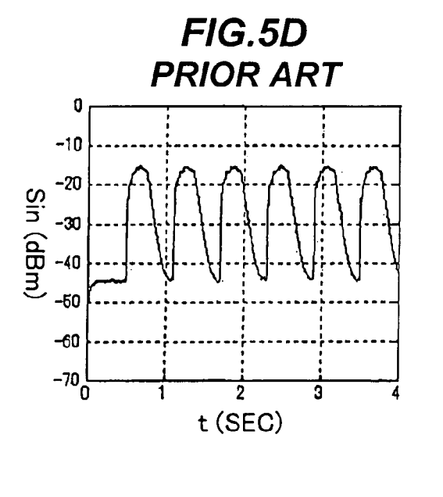
Figure 5E:
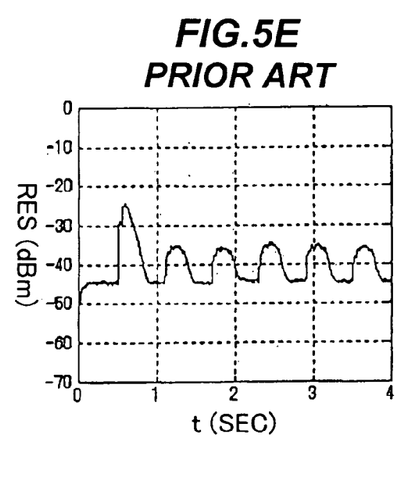

As shown by the signal levels in FIGS. 5B and 5E, the peak echo signal level of the near-end input signal Sin was again about −15 dBm, and the level of the residual error signal RES after convergence was about −35 dBm. Accordingly, although the echo was reduced, the residual signal level was still larger by about 10 dBm than the background noise level of −45 dBm, indicating significantly degraded echo canceling performance.

The reason why echo canceling performance is degraded in an environment with much background noise is thought to be as follows. The near-end input signal Sin input to the subtractor 12 includes background noise from the near end and line echo from the hybrid circuit 20. Subtraction of the echo replica signal y(n) from the near-end input signal in the subtractor 12 reduces the line echo, but does not reduce the near-end background noise, which remains present in the residual error signal RES. When the adaptive filter 11 updates its coefficients, this background noise interferes so that the filter coefficients do not converge as expected, making the echo replica signal an inaccurate replica of the true line echo.

The echo canceling performance in an environment with much background noise can be improved by reducing the step size parameter α and increasing the constant β, but this method has the drawback of reducing the speed of convergence in an environment with little background noise.

SUMMARY OF THE INVENTION

An object of the present invention is to provide an echo canceler and echo canceling method with improved echo canceling performance in environments with much background noise, without reducing the speed of convergence in environments with little background noise.

To an echo canceler having an adaptive filter that generates an echo replica signal from filter coefficients and a far-end signal, and a subtractor that subtracts the echo replica signal from a near-end signal to remove an echo of the far-end signal in the near-end signal and generate a residual error signal, the present invention adds a background noise estimator for estimating near-end background noise power from the residual error signal, and a step size calculator for using the estimated near-end background noise power to calculate a step size. The step size is supplied to the adaptive filter and used to control adaptive updating of the filter coefficients.

In one embodiment of the invention, the step size is calculated as a fraction in which the estimated near-end background noise power forms an additive term in the denominator.

According to this scheme, the step size is reduced during periods of high near-end background noise, causing the filter coefficients to be altered by smaller amounts, so that echo cancellation is not disrupted by effects of the background noise. During times of lower near-end background noise, a larger step size is used, permitting faster convergence of the filter coefficients.

DETAILED DESCRIPTION OF THE INVENTION

Embodiments of the invention will now be described with reference to the attached drawings, in which like elements are indicated by like reference characters. The echo cancelers and echo canceling methods in the embodiments are used to cancel echo arising from a hybrid circuit that interfaces a two-wire telephone subscriber line to a four-wire telephone trunk line or switching circuit.

First Embodiment

Figure 6:
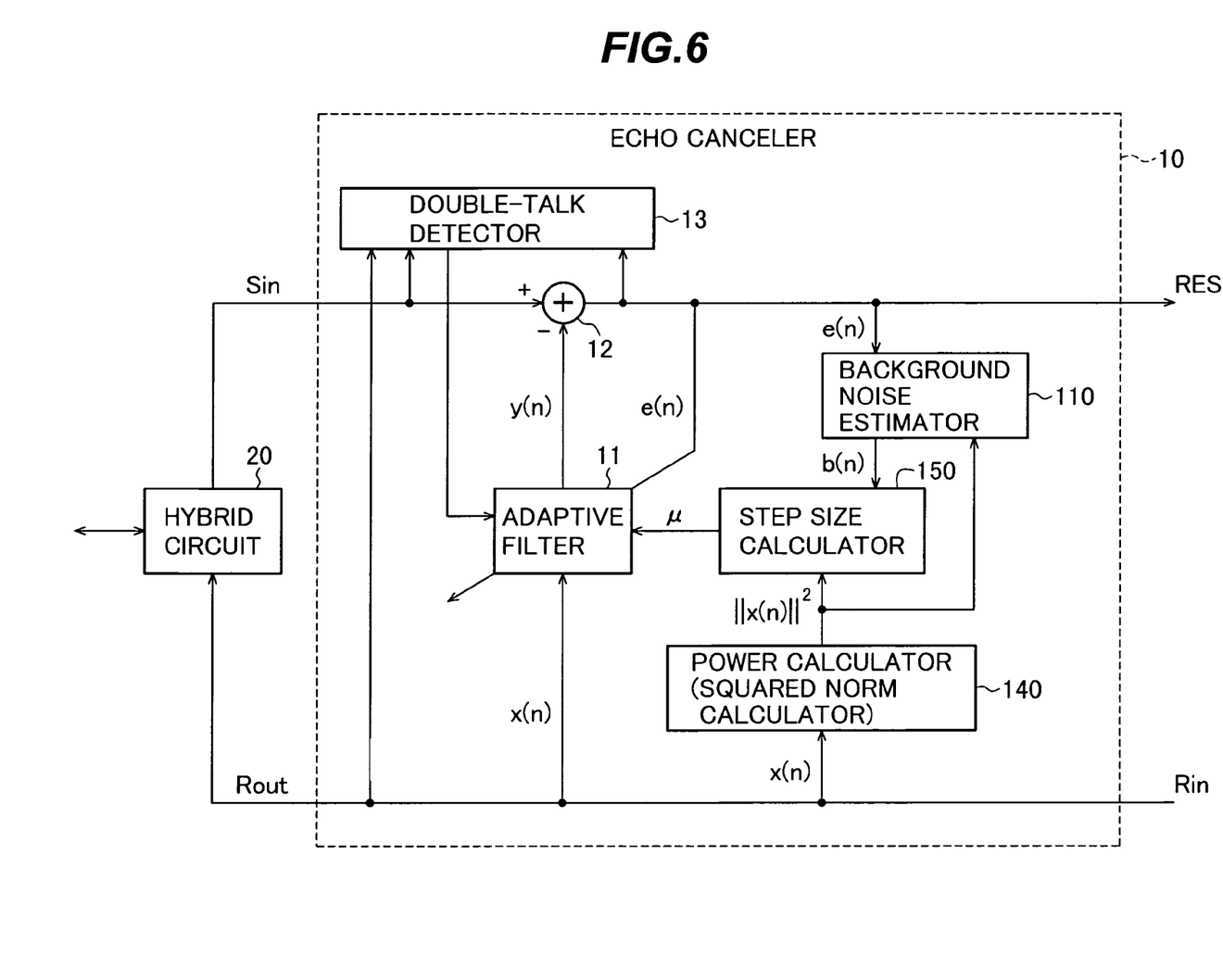
FIG. 6 is a functional block diagram of an echo canceler illustrating a first embodiment of the invention.

Referring to FIG. 6, the echo canceler 100 in the first embodiment comprises at least an adaptive filter 11, a subtractor 12, a double-talk detector 13, a background noise estimator 110, a power calculator 140, and a step size calculator 150. This echo canceler 100 is obtained by adding the background noise estimator 110 to the conventional echo canceler shown in FIG. 1, replacing the squared norm calculator with the power calculator 140, and altering the operation of the step size calculator.

The adaptive filter 11 receives a step size µ from the step size calculator 150, performs the calculations in the modified normalized LMS coefficient updating formula given in the background, using the received step size µ, to update the filter coefficients, calculates the echo replica signal y(n) by the formula given in the background, and supplies the echo replica signal y(n) to the subtrahend input terminal of the subtractor 12.

The subtractor 12 subtracts the echo replica signal y(n) from a near-end input signal Sin to remove an echo of the far-end signal in the near-end signal.

The power calculator 140 calculates the power level of the far-end input signal Rin (denoted x(n) to indicate the discrete time variable n) and provides the calculated power level to the step size calculator 150 and the background noise estimator 110.

The power calculator 140 calculates the power level of the far-end input signal Rin (x(n)). In this embodiment, the power level is calculated by the same formula as the squared norm $\|x(n)\|^2$ used in the normalized LMS algorithm. The invention is not limited to this method of calculating the power level, however; other methods may be used.

The background noise estimator 110 estimates the near-end background noise power from the residual error signal RES (also denoted e(n)) output from the subtractor 12 and the power level ($\|x(n)\|^2$) of the far-end input signal Rin (x(n)) calculated by the power calculator 140. Specifically, when the power level of the far-end input signal Rin is below a threshold value (that is, when the party at the far end is not speaking), the background noise estimator 110 calculates an average power level of the residual error signal RES (e(n)) to estimate the near-end background noise power b(n). The background noise estimator 110 provides the estimated near-end background noise power b(n) to the step size calculator 150.

More specifically, the background noise estimator 110 receives the power value ($\|x(n)\|^2$) from the power calculator 140 and enables the calculation for estimating the background noise power if the condition $\|x(n)\|^2 \leq -40$ dBm is true; otherwise, the background noise estimator 110 keeps the background noise power estimate unchanged. The threshold value (−40 dBm) is exemplary; other values could be used instead.

Figure 7:
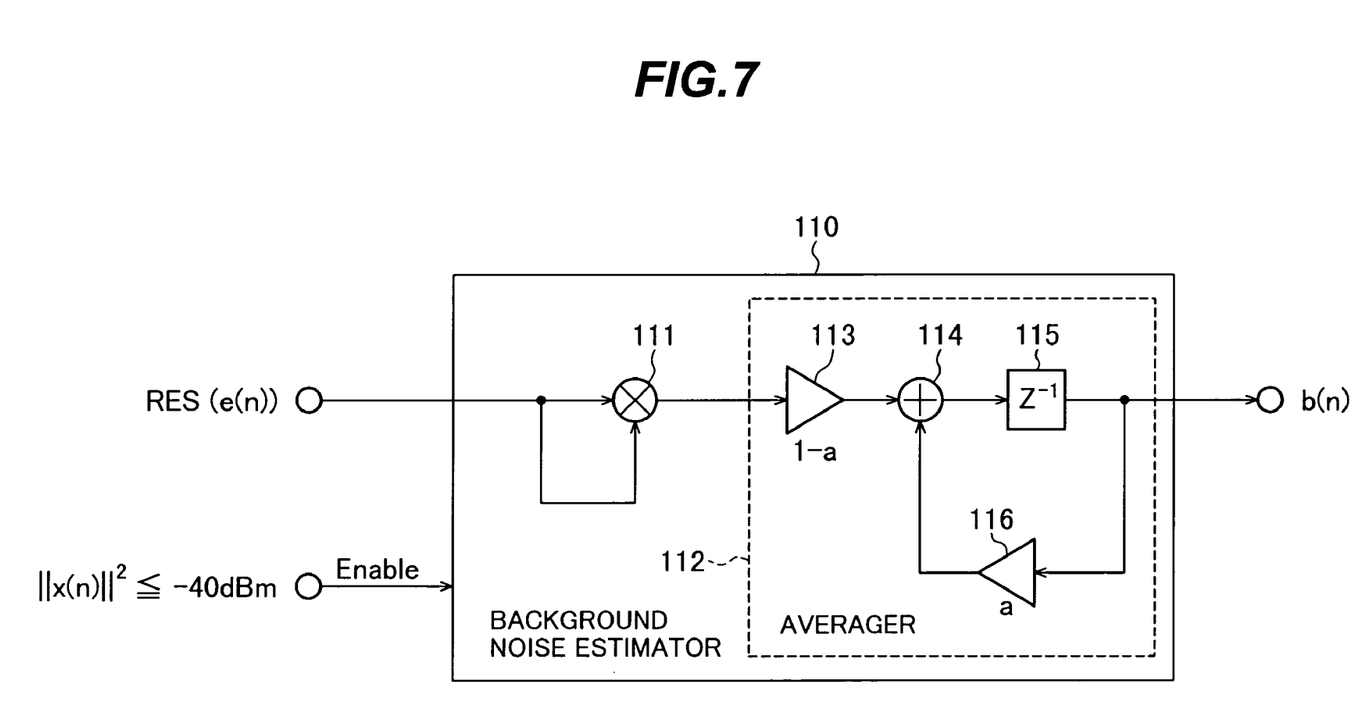
FIG. 7 is a block diagram illustrating the internal structure of the background noise estimator in FIG. 6.

Referring to FIG. 7, the background noise estimator 110 comprises a multiplier 111 and an averager 112. The averager 112 is, for example, an infinite impulse response (IIR) low-pass filter (LPF) including multipliers 113, 116, an adder 114, and a delay element 115.

When the background noise estimator 110 is enabled, the multiplier 111 squares the residual error signal RES (e(n)) and provides the squared result to the averager 112.

To calculate the estimated background noise power value b(n), the averager 112 uses a predetermined time constant to average the squared results from the multiplier 111.

The time constant in the first embodiment is, for example, 200 ms. The averager 112 calculates a weighted average of the current squared result and the previous calculated average, where the weight of the current squared result is (1-a) and the weight of the previous calculated average is a. The coefficient a is equal to exp(−T/CR), where T and CR are the sampling period and time constant of the averager 112, respectively.

The reason for estimating the background noise power from the residual error signal RES instead of the near-end input signal Sin is as follows. Even when the power level of the far-end input signal Rin is below −40 dBm, the near-end input signal Sin may include a small echo component. This echo component is attenuated in the residual error signal RES that has passed through the subtractor 12. By use of the residual error signal RES instead of the near-end input signal Sin, the effect of the echo can be reduced as much as possible.

The step size calculator 150 calculates the value of the step size µ from the output of the background noise estimator 110. More specifically, the step size calculator 150 receives the background noise power estimated value b(n) from the background noise estimator 110 and the power level (squared norm ($\|x(n)\|^2$) of the far-end input signal Rin from the power calculator 140 and performs the following calculation.

$$\mu = \frac{\alpha}{\gamma \cdot b(n) + \beta + \|x(n)\|^2}.$$

In the above equation, a is a step size parameter, and the quantity β is a constant that is normally greater than zero, but may be set to zero.

The estimated value b(n) is the output value of the background noise estimator 110, and γ is a constant such as, for example, 100×M, where M is the filter tap length.

The term $\|x(n)\|^2$ is the squared norm of the far-end input signal Rin (x(n)) and is calculated as follows:

$$\|x(n)\|^2 = x^2(n) + x^2(n-1) + \ldots + x^2(n-M+1)$$
$$= \|x(n-1)\|^2 + x^2(n) - x^2(n-M)$$

Next, the operation of the echo canceler 100 (the echo canceling method) will be described.

The far-end input signal Rin received by the echo canceler 100 from the party at the far end is input to the power calculator 140 and adaptive filter 11, and is also passed to the hybrid circuit 20 via the receiving path in the echo canceler 100.

When the power calculator 140 receives the far-end input signal Rin, it calculates the power level ($\|x(n)\|^2$) of the received signal (x(n) is identical to Rin) and supplies the calculated power level to the step size calculator 150 and the background noise estimator 110.

The hybrid circuit 20 transmits the far-end output signal Rout onward to the party at the near end, or more precisely, to the near-end party's telephone (not shown).

Some of the signal energy, however, leaks into the near-end input signal Sin and returns to the echo canceler 100 as line echo. If only the far-end party is speaking, substantially all of the near-end input signal Sin may be line echo, which is input to the subtractor 12 in the echo canceler 100.

In the echo canceler 100, the adaptive filter 11 uses the filter coefficients to filter the far-end input signal x(n) (identical to Rin), thereby generates the echo replica signal y(n), and outputs it to the subtractor 12. The echo replica signal y(n) can be obtained according to the equation given above.

The subtractor 12 subtracts the echo replica signal y(n) from the near-end input signal Sin (echo signal) and outputs the resulting residual error signal RES to the adaptive filter 11, the step size calculator 150, and the background noise estimator 110, as well as to the far end.

The background noise estimator 110 compares the power level ($\|x(n)\|^2$) of the far-end input signal Rin with a threshold value (for example, −40 dBm). If the power level ($\|x(n)\|^2$) of the far-end input signal Rin is below the threshold value (that is, $\|x(n)\|^2 \leq -40$ dBm), the background noise estimator 110 enables the estimation, squares the received residual error signal RES (e(n)), and averages the multiplication results, thereby estimating the power level of the residual error signal RES, and provides the estimated value b(n) to the step size calculator 150.

The step size calculator 150 receives the power level ($\|x(n)\|^2$) of the far-end input signal Rin from the power calculator 140 and the estimated value b(n) of the background noise power from the background noise estimator 110, uses these values to calculate the step size parameter μ by the formula given above, and provides the result (μ) to the adaptive filter 11.

Figure 8:
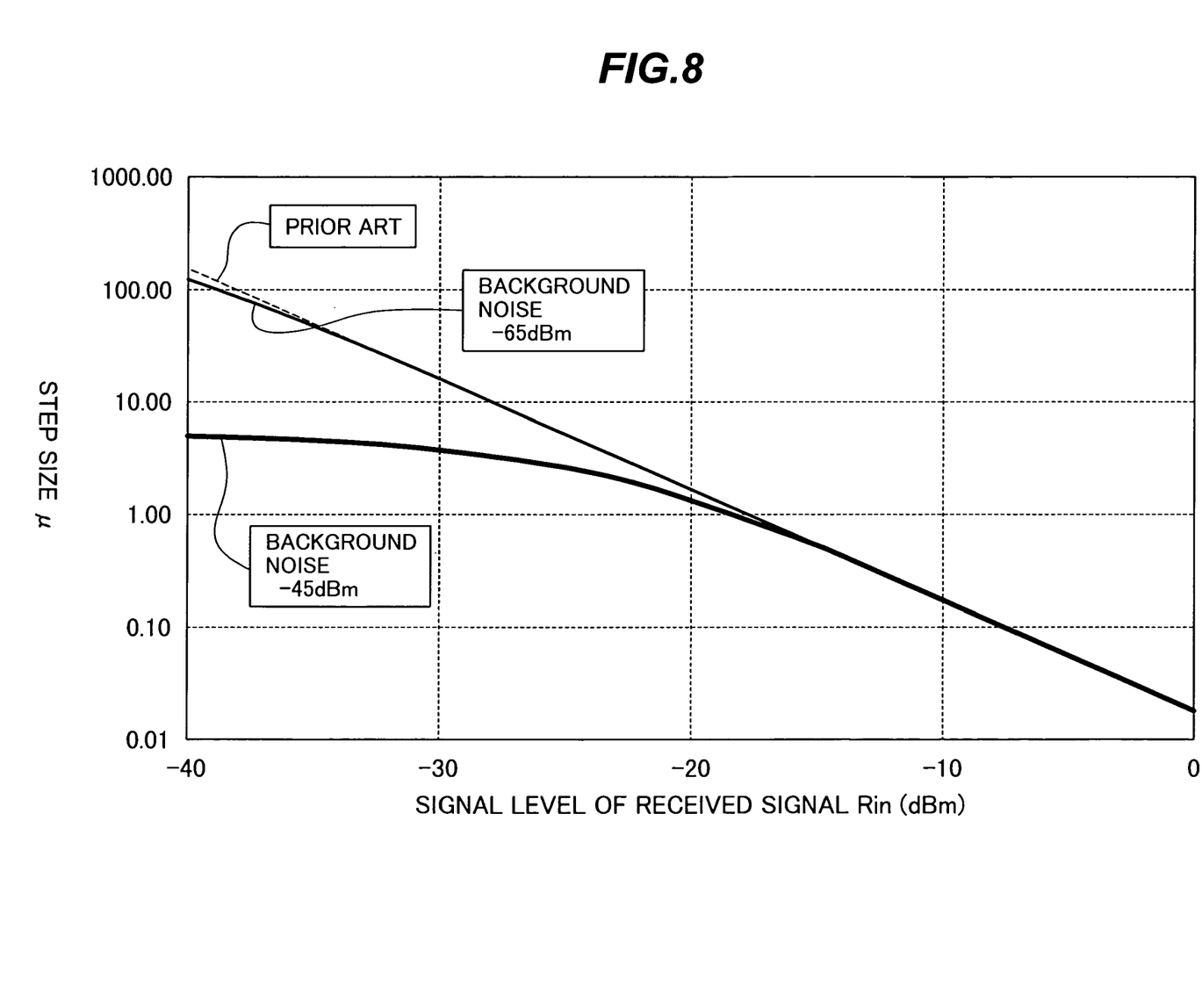
FIG. 8 is a graph showing relations between step size and received signal level in the first embodiment and the conventional echo canceler.

The graph in FIG. 8 shows relations between the step size μ and the received signal level when the step size parameters α, β, the tap length M, and the constant γ are set to the following values: α=0.5, β=0, M=128, γ=12,800 (γ=100×M). The dotted curve represents the step size in the in the prior-art echo canceler 10.

As shown in FIG. 8, in an environment with a sufficiently small background noise power, such as a background noise power of −65 dBm, there is substantially no difference between the step size μ in the first embodiment and in the prior-art echo canceler 10 regardless of the power level of the far-end input signal Rin (x(n)).

In contrast, in an environment with a relatively large background noise power, such as a background noise power of −45 dBm, as the power level of the far-end input signal Rin (x(n)) decreases, the difference between the step size μ in the first embodiment and the step size in the prior-art echo canceler 10 becomes significant.

More specifically, when the power level of the far-end input signal Rin is in the range from 0 dBm to −10 dBm, for example, the step size μ in the first embodiment is substantially the same as in the prior art. If the power value of the far-end input signal Rin becomes lower than about −10 dBm, the step size μ in the first embodiment becomes smaller than in the prior art.

Figure 9A:
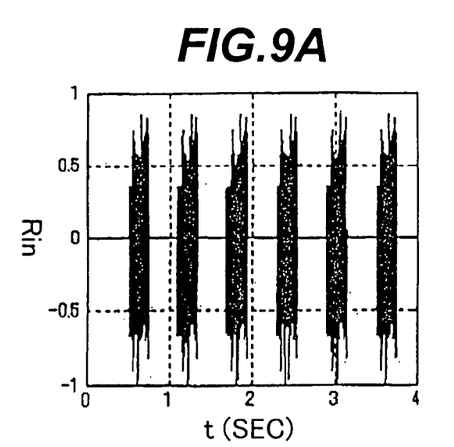
FIGS. 9A to 9F show simulated signal waveforms in the first embodiment in an environment with much background noise.
Figure 9B:
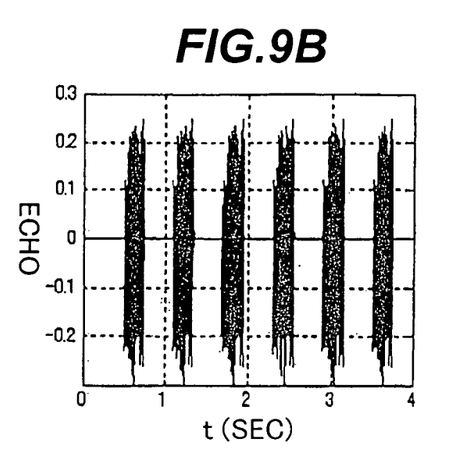
Figure 9C:
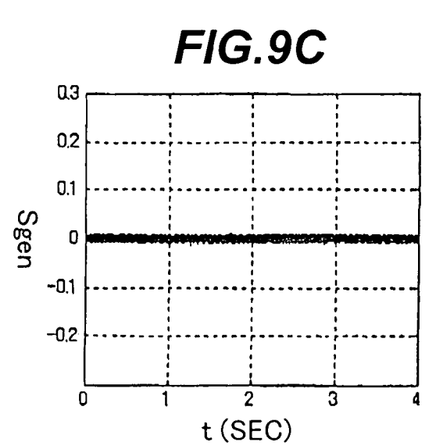
Figure 9D:
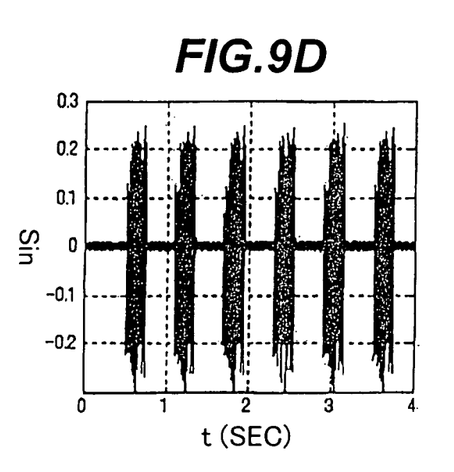
Figure 9E:
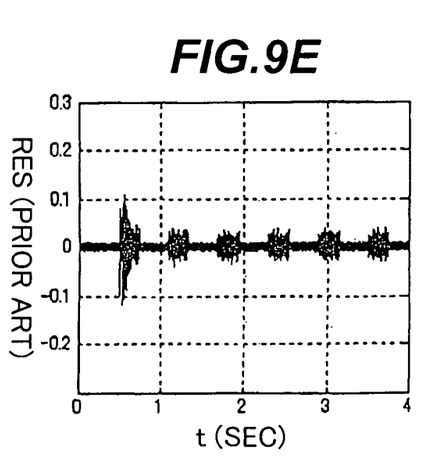
Figure 9F:
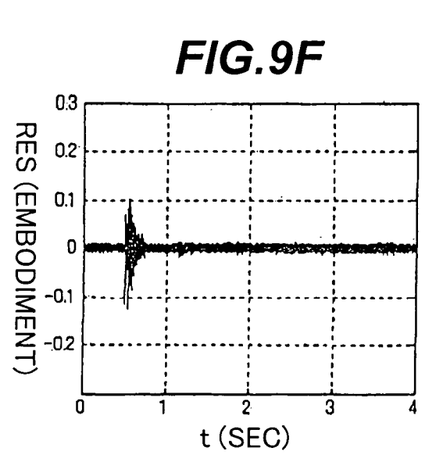
Figure 10A:
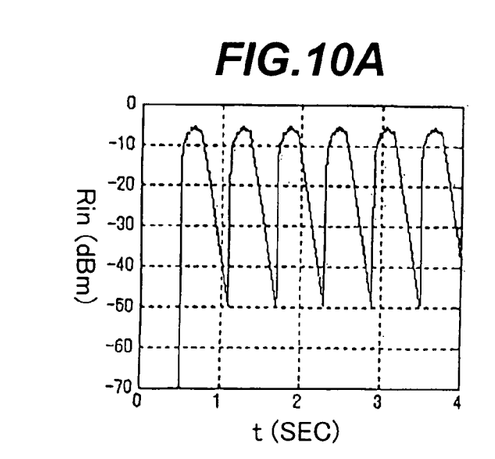
FIGS. 10A to 10F show simulated signal level waveforms in the first embodiment in an environment with much background noise.
Figure 10B:
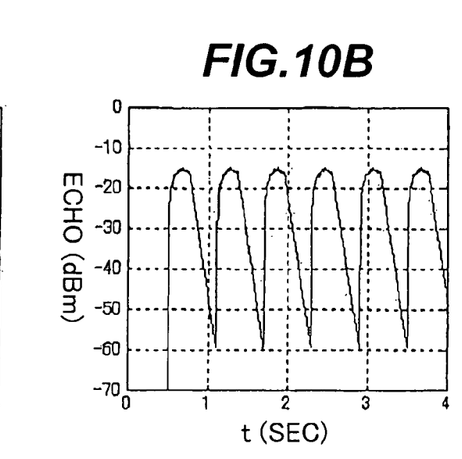
Figure 10C:
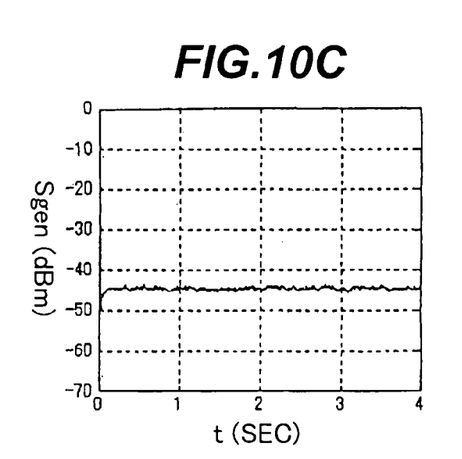
Figure 10D:
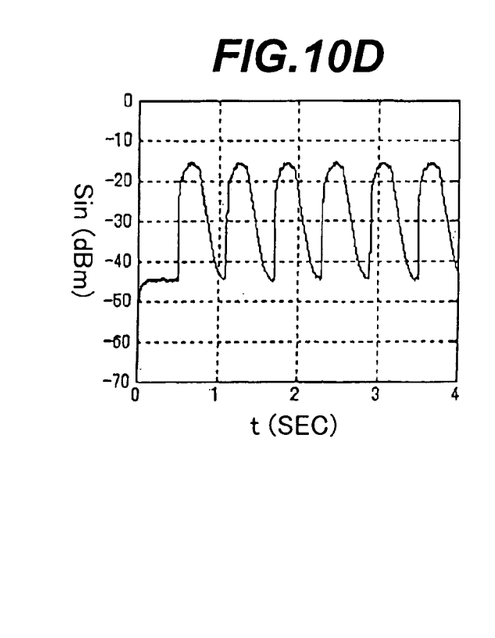
Figure 10E:
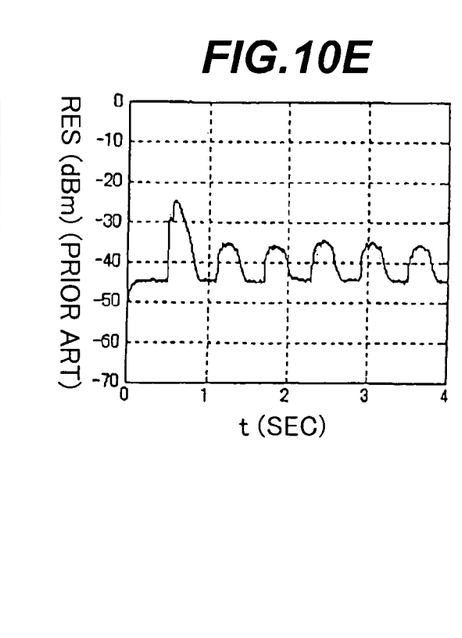
Figure 10F:
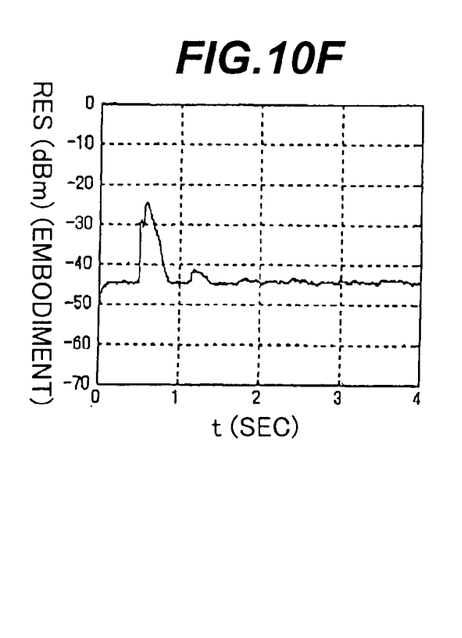

FIGS. 9A to 9F show simulated signal waveforms in an environment with a relatively high average background noise level (about −45 dBm). FIGS. 10A to 10F show the corresponding simulated signal level (power level) waveforms. The signals shown in FIGS. 9A to 9E and FIGS. 10A to 10E are the same as in FIGS. 4A to 4E and FIGS. 5A to 5E, illustrating echo cancellation in the prior art. The residual signals RES in FIGS. 9F and 10F illustrate cancellation of the same echo under the same high background noise conditions in the first embodiment.

As described above, in the conventional echo canceler 10, the peak echo signal level of the near-end input signal Sin was about −15 dBm, and the level of the residual error signal RES after convergence was about −35 dBm. Accordingly, although the echo was reduced, the residual signal level was larger by about 10 dBm than the background noise level (−45 dBm), indicating significantly degraded echo canceling performance.

In contrast, as shown in FIGS. 9F and 10F, when the echo canceler 100 in the first embodiment of the invention was used, the level of the residual error signal RES after convergence was substantially unchanged at −45 dBm and the echo was reduced to a level where peaks could not be recognized any more. That is, the first embodiment has the effect of improving echo canceling performance in environments with much background noise.

Figure 11A:
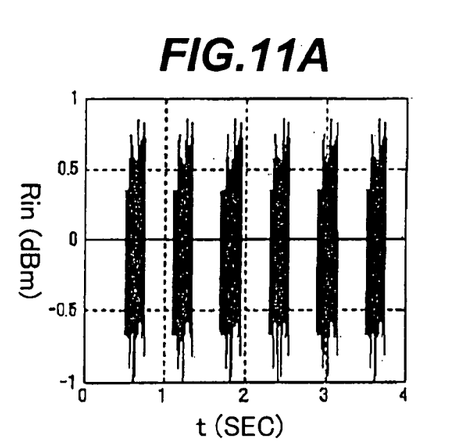
FIGS. 11A to 11F show simulated signal waveforms in the first embodiment in an environment with little background noise.
Figure 11B:
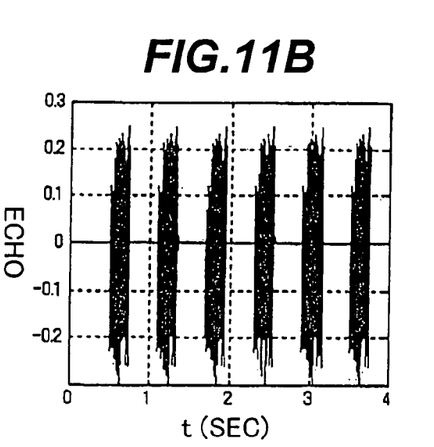
Figure 11C:
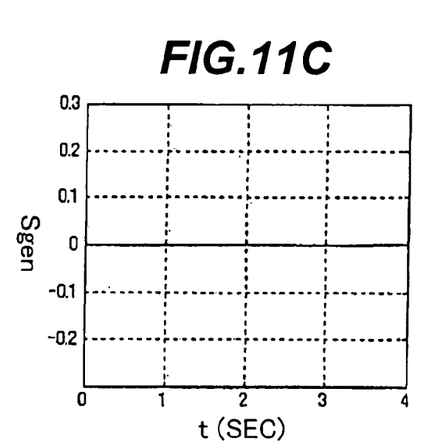
Figure 11D:
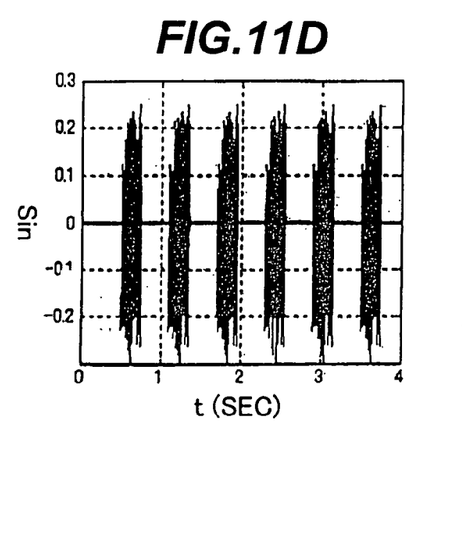
Figure 11E:
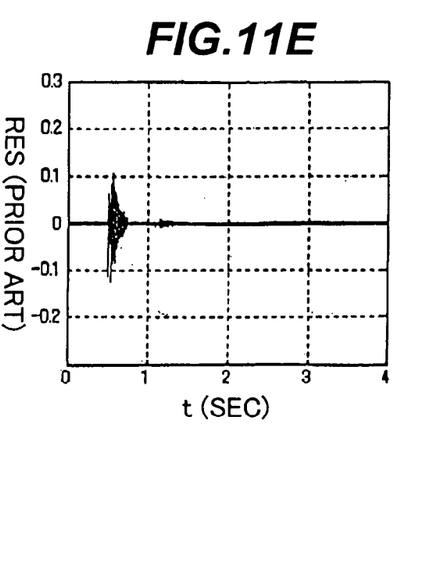
Figure 11F:
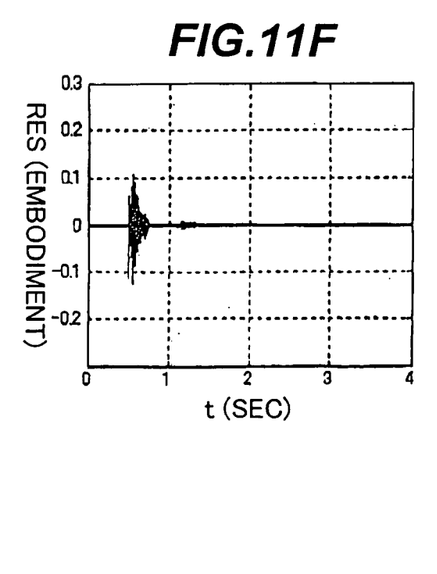
Figure 12A:
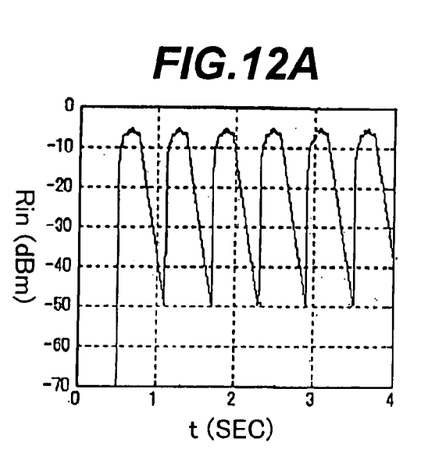
FIGS. 12A to 12F show simulated signal level waveforms in the first embodiment in an environment with little background noise.
Figure 12B:
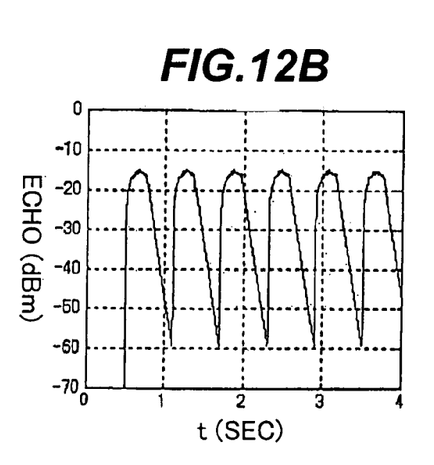
Figure 12C:
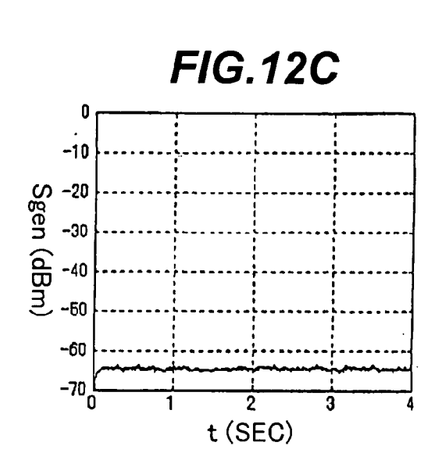
Figure 12D:
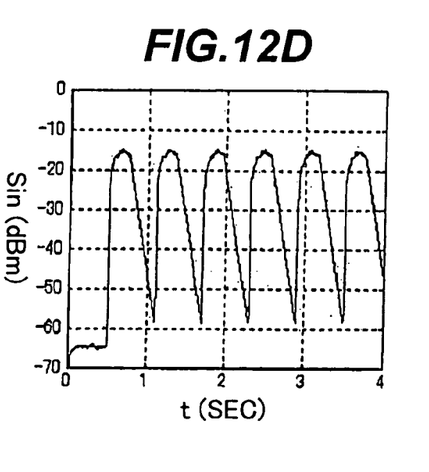
Figure 12E:
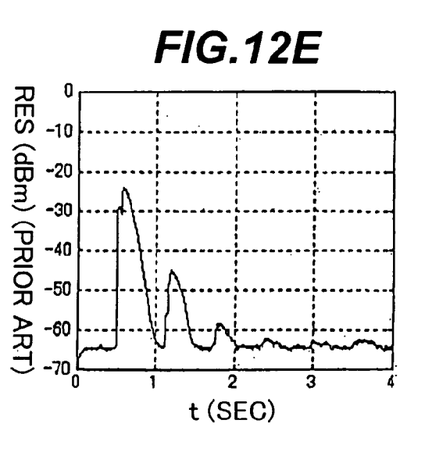
Figure 12F:
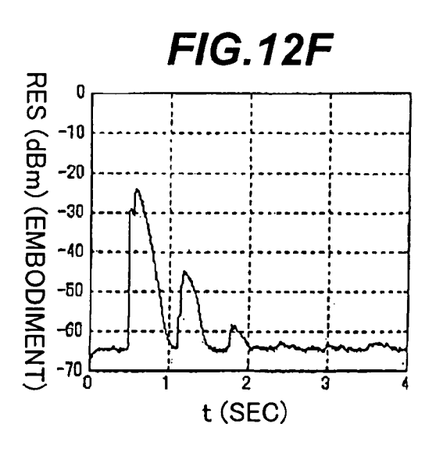

FIGS. 11A to 11F show simulated signal waveforms in an environment with a low background noise level (for example, −65 dBm). FIGS. 12A to 12F show the corresponding simulated signal level (power level) waveforms. The signals shown in FIGS. 11A to 11E and FIGS. 12A to 12E are the same as in FIGS. 2A to 2E and FIGS. 3A to 3E, illustrating echo cancellation in the prior art. The residual signals RES in FIGS. 11F and 12F illustrate cancellation of the same echo under the same low background noise conditions in the first embodiment. Under these conditions, as shown in FIG. 8, the step size μ is substantially the same as in the prior art. Accordingly, both the speed of convergence and the echo canceling performance are substantially the same as in the prior art, and the level of the residual error signal RES after convergence is close to the background noise level of −65 dBm.

As described above, the first embodiment has the effect of improving echo canceling performance in environments with much background noise, without reducing the speed of convergence in environments with little background noise.

Second Embodiment

The echo canceler and echo canceling method in the second embodiment of the invention will now be described with reference to the drawings.

Figure 13:
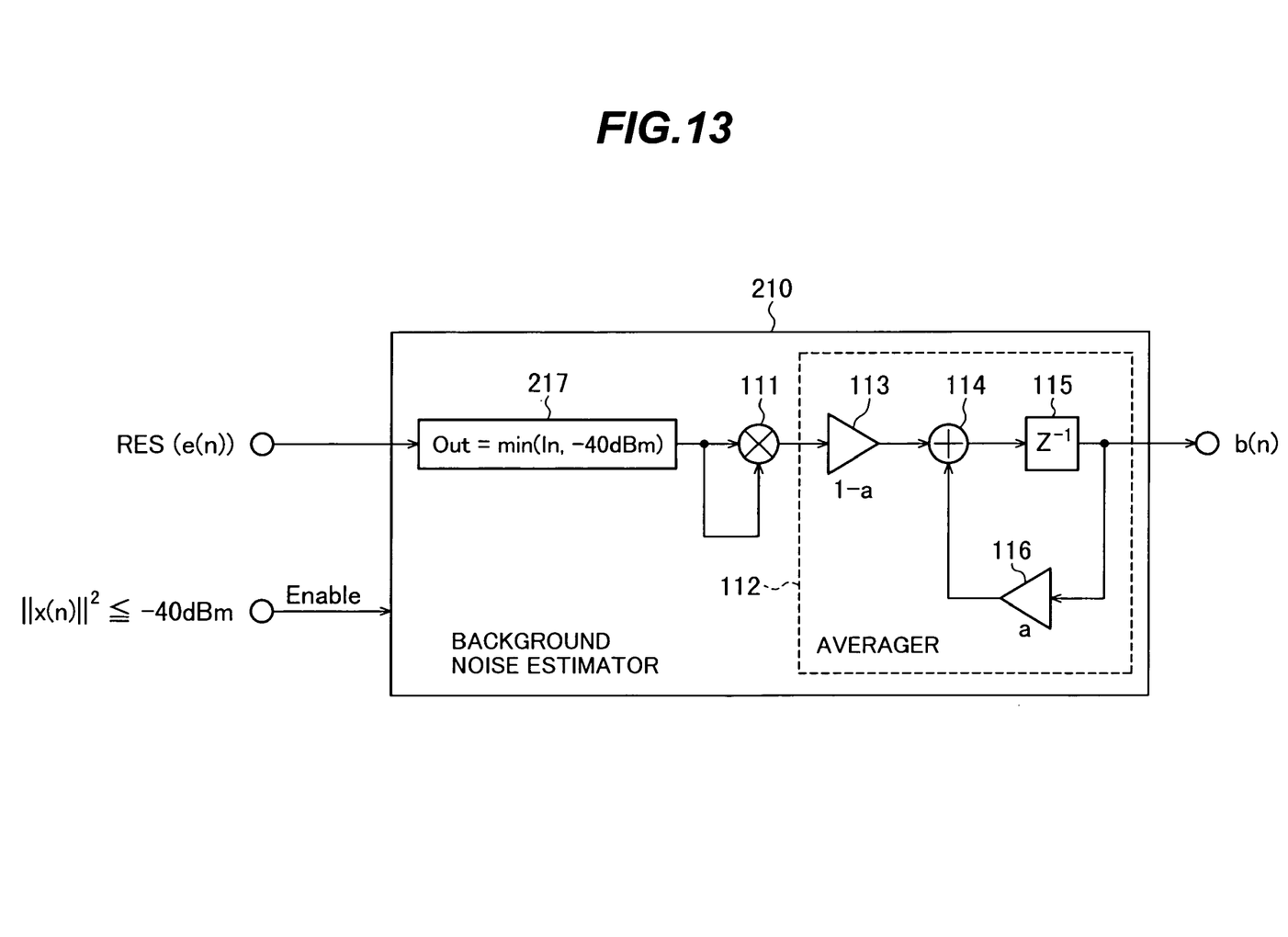
FIG. 13 is a block diagram illustrating the internal structure of the background noise estimator in a second embodiment of the invention.

The echo canceler according to the second embodiment is obtained from the echo canceler 100 according to the first embodiment in FIG. 6 by replacing the background noise estimator 110 shown in FIG. 7 with the background noise estimator 210 shown in FIG. 13.

The internal structure of the background noise estimator 210 in FIG. 13 will be described below. The other parts are the same as in FIG. 6.

Referring to FIG. 13, the background noise estimator 210 comprises an amplitude limiter 217, a multiplier 111, and an averager 112. As in the first embodiment, the averager 112 is, for example, an infinite impulse response (IIR) low pass filter (LPF) including multipliers 113, 116, an adder 114, and a delay element 115.

The amplitude limiter 217 pre-processes the residual error signal RES before it is squared, by limiting the amplitude of the input residual error signal RES to an amplitude limiting threshold value. The amplitude-limited signal output from the amplitude limiter 217 is supplied to both input terminals of the multiplier 111. The amplitude limiting threshold value may be, for example, the amplitude of a −40 dBm sine wave.

Next, the operation (the echo canceling method) of the echo canceler in the second embodiment will be described.

The echo canceling method in the second embodiment differs from the method in the first embodiment in regard to the estimation of the background noise power b(n) in the background noise estimator 210.

As in the first embodiment, the background noise estimator 210 is enabled when the far-end input signal Rin is treated as silent or when the power level ($\|x(n)\|^2$) of the far-end input signal x(n) is below −40 dBm.

When the near-end input signal Sin from the party at the near end includes only background noise and the amplitude of the background noise is less than the amplitude limiting threshold value, substantially all of the background noise appears directly in the residual error signal RES (e(n)) and in the output of the amplitude limiter 217. Accordingly, the output value b(n) of the amplitude limiter 217 can be expected to be close to the average background noise power.

In the first embodiment, when the near-end input signal Sin received from the party at the near end includes not only background noise but also a voice component (the voice of a person at the near end), the output value b(n) of the background noise estimator 110 may significantly exceed the actual background noise, because of the effect of the voice signal.

If this happens, the step size μ calculated by the step size calculator 150 becomes unnecessarily small, and the convergence of the filter coefficients in the adaptive filter 11 becomes unnecessarily slow.

In the second embodiment, even when a voice component is present, the amplitude limiter 217 limits the amplitude of the residual error signal RES (e(n)) from which the background noise is estimated. This prevents the output value b(n) of the background noise estimator 210 from becoming much larger than the actual background noise.

As described above, the second embodiment provides the same effects as the first embodiment, but since the background noise estimator 210 in the second embodiment includes the amplitude limiter 217, even when the near-end input signal Sin includes not only background noise but also a voice signal, because of the amplitude limitation in the background noise estimator 210, the output value of the background noise estimator 210 does not become much larger than the actual background noise. As a result, the second embodiment has the effect of preventing the speed of convergence during updating of the filter coefficients from decreasing.

The present invention is applicable not only to echo cancelers that remove line echo arising from a hybrid circuit that interfaces a two-wire telephone circuit to a four-wire telephone circuit, but also to echo cancelers that cancel acoustic echo that enters a microphone from a speaker.

The echo cancelers in the first and second embodiments have been described as being implemented by hardware, but they may also be implemented by software. If implemented by hardware, they may be implemented as one semiconductor chip or as part of a chip.

The parameter γ by which the estimated background noise power is multiplied in determining the step size μ in the first and second embodiments has been described as a constant, but γ may have any value, or may be variable. The value of γ can be adjusted to adjust the relationship of the step size μ to the estimated background noise power b(n): if the value of γ is decreased, the step size μ becomes larger; if the value of γ is increased, the step size μ becomes smaller.

The amplitude limiter 217 in the second embodiment need not be located just in front of the multiplier 111 as in FIG. 13; other locations are possible, provided they allow the amplitude limiter 217 to reduce the effect of the voice signal input at the near end. For example, a limiting circuit for limiting the squared value calculated by the multiplier 111 may be provided between the multiplier 111 and the averager 112.

Those skilled in the art will recognize that further variations are possible within the scope of the invention, which is defined in the appended claims.

What is claimed is:

1. An echo canceler having an adaptive filter that generates an echo replica signal from filter coefficients and a far-end signal, and a subtractor that subtracts the echo replica signal from a near-end signal to remove an echo of the far-end signal in the near-end signal, leaving a residual error signal, the echo canceler comprising:
   a background noise estimator for estimating near-end background noise power from the residual error signal; and
   a step size calculator for using the estimated near-end background noise power to calculate a step size and supplying the step size to the adaptive filter to control adaptive updating of the filter coefficients in the adaptive filter; and
   wherein the step size calculator calculates the step size by the following formula, in which μ is the step size, n is a discrete time variable, x(n) is the far-end signal, b(n) is the estimated near-end noise power, and α, β, and γ are constants:

$$\mu = \frac{\alpha}{\gamma \cdot b(n) + \beta + \|x(n)\|^2}.$$

2. The echo canceler of claim 1, further comprising a power calculator for determining a power level of the far-end signal, wherein the step size calculator calculates an average power level of the residual error signal, estimates the near-end background noise power as the average power level of the residual error signal when the power level of the far-end signal is below a predetermined threshold value, and keeps the estimated near-end background noise power unchanged when the power level of the far-end signal is above the predetermined threshold value.

3. The echo canceler of claim 2, wherein the power calculator comprises:
   a multiplier for calculating a square of the residual error signal; and
   an averager for calculating an average value of the square of the residual error signal.

4. The echo canceler of claim 3, wherein the power calculator further comprises an amplitude limiter for limiting an amplitude of the residual error signal, wherein the multiplier calculates the square of the amplitude-limited residual error signal.

5. An echo canceling method, comprising:
   generating an echo replica signal from filter coefficients and a far-end signal;
   subtracting the echo replica signal from a near-end signal to remove an echo of the far-end signal in the near-end signal, thereby generating a residual error signal;
   estimating near-end background noise power from the residual error signal;
   calculating a step size by using at least the estimated near-end background noise power; and
   updating the filter coefficients in steps equal to the calculated step size; and
   wherein the step size is calculated by the following formula, in which $\mu$ is the step size, n is a discrete time variable, x(n) is the far-end signal, b(n) is the estimated near-end noise power, and $\alpha$, $\beta$, and $\gamma$ are constants:

$$\mu = \frac{\alpha}{\gamma \cdot b(n) + \beta + \|x(n)\|^2}.$$

6. The echo canceling method of claim 5, wherein estimating the near-end background noise power further comprises:
   determining a power level of the far-end signal;
   calculating an average power level of the residual error signal;
   estimating the near-end background noise power as the average power level of the residual error signal when the power level of the far-end signal is below a predetermined threshold value; and
   keeping the estimated near-end background noise power unchanged when the power level of the far-end signal is above the predetermined threshold value.

7. The echo canceling method of claim 6, wherein calculating the average power level of the residual error signal further comprises:
   calculating a square of the residual error signal; and
   calculating an average value of the square of the residual error signal.

8. The echo canceling method of claim 7, wherein calculating the average power level of the residual error signal further comprises limiting an amplitude of the residual error signal, the square of the residual error signal being calculated as the square of the amplitude-limited residual error signal.

* * * * *